(12) United States Patent
Borgaonkar et al.

(10) Patent No.: US 7,764,837 B2
(45) Date of Patent: Jul. 27, 2010

(54) SYSTEM, METHOD, AND APPARATUS FOR CONTINUOUS CHARACTER RECOGNITION

(75) Inventors: Shekhar Ramachandra Borgaonkar, Karnataka (IN); Sriganesh Madhvanath, Karnataka (IN); Prashanth Pandit, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/572,816

(22) PCT Filed: Sep. 1, 2004

(86) PCT No.: PCT/US2004/028332
§ 371 (c)(1),
(2), (4) Date: May 23, 2008

(87) PCT Pub. No.: WO2006/028438
PCT Pub. Date: Mar. 16, 2006

(65) Prior Publication Data
US 2008/0260252 A1    Oct. 23, 2008

(51) Int. Cl.
*G06K 9/00*    (2006.01)
*G06K 9/18*    (2006.01)

(52) U.S. Cl. ............... 382/186; 382/187; 382/189
(58) Field of Classification Search .......... 382/186–189
See application file for complete search history.

(56) References Cited

U.S. PATENT DOCUMENTS

| | | | |
|---|---|---|---|
| 5,699,455 A * | 12/1997 | Arai et al. | 382/187 |
| 5,917,941 A | 6/1999 | Webb et al. | |
| 5,926,566 A * | 7/1999 | Wang et al. | 382/185 |
| 5,936,566 A | 8/1999 | Park | |
| 6,418,239 B1 | 7/2002 | Hullender et al. | |

* cited by examiner

*Primary Examiner*—Wesley Tucker
(74) *Attorney, Agent, or Firm*—Prakash Nama; Global IP Services, PLLC

(57) ABSTRACT

A technique for continuously recognizing a character entry into a computer. In one example embodiment, this is achieved by drawing a character in a continuous stroke order using a stylus [210] on touch screen [220]. As associated data of the drawn continuous stroke order is then inputted into a continuous character recognizer [930] via the touch screen [220]. One or more hypothesis candidate characters including the continuous stroke order are then produced by the continuous character recognizer [930] upon a partial recognition. The produced one or more hypothesis candidate characters are then displayed substantially over the drawn continuous stroke order on a display device [230].

20 Claims, 9 Drawing Sheets

SYSTEM, METHOD, AND APPARATUS FOR CONTINUOUS CHARACTER RECOGNITION

TECHNICAL FIELD OF THE INVENTION

The present invention relates generally to a user interface in a computer system, and more particularly relates to character recognition during data entry into a computer.

BACKGROUND OF THE INVENTION

In the modern world, computing devices are getting smaller, more powerful, and cheaper to produce. These devices require text input devices that are not quite as cumbersome as keyboards. Miniature keyboards and soft keyboards are available on small handheld devices, such as PDAs, but are only practical for small data entry operations. In general, such keyboards use up valuable real estate on these devices and are difficult to use. Users who are less-literate and not computer proficient generally find the conventional keyboards to be the most intimidating parts of a computer.

One potential alternative for keyboards is handwriting recognition. However, the recognition accuracy of these devices is compromised in an attempt to provide a specialized alphabet that is accessible to all users, along with a recognition method robust enough to handle the different writing styles of an arbitrary user. One of the current techniques, referred to as Graffiti, forces users to learn an alphabet that is potentially different from the everyday alphabet they are accustomed to using. This can be an un-natural usage of alternate shapes for standard alphabets and can be difficult and time consuming to learn the drawing of alternate shapes for the standard alphabets. This technique generally has not been an acceptable solution to the users.

SUMMARY OF THE INVENTION

According to an aspect of the subject matter, there is provided a method for continuous recognition of a character entry into a computer, the method including the steps of drawing a desired character in a continuous stroke order using a stylus on a touch screen, inputting an associated data of the continuous stroke order, as the continuous stroke order continues, into a continuous character recognizer via the touch screen, producing one or more hypothesis candidate characters including the associated data of the continuous stroke order by the continuous character recognizer upon a partial recognition of the associated data, and displaying the produced one or more hypothesis candidate characters substantially over the drawn continuous stroke order on a display device.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
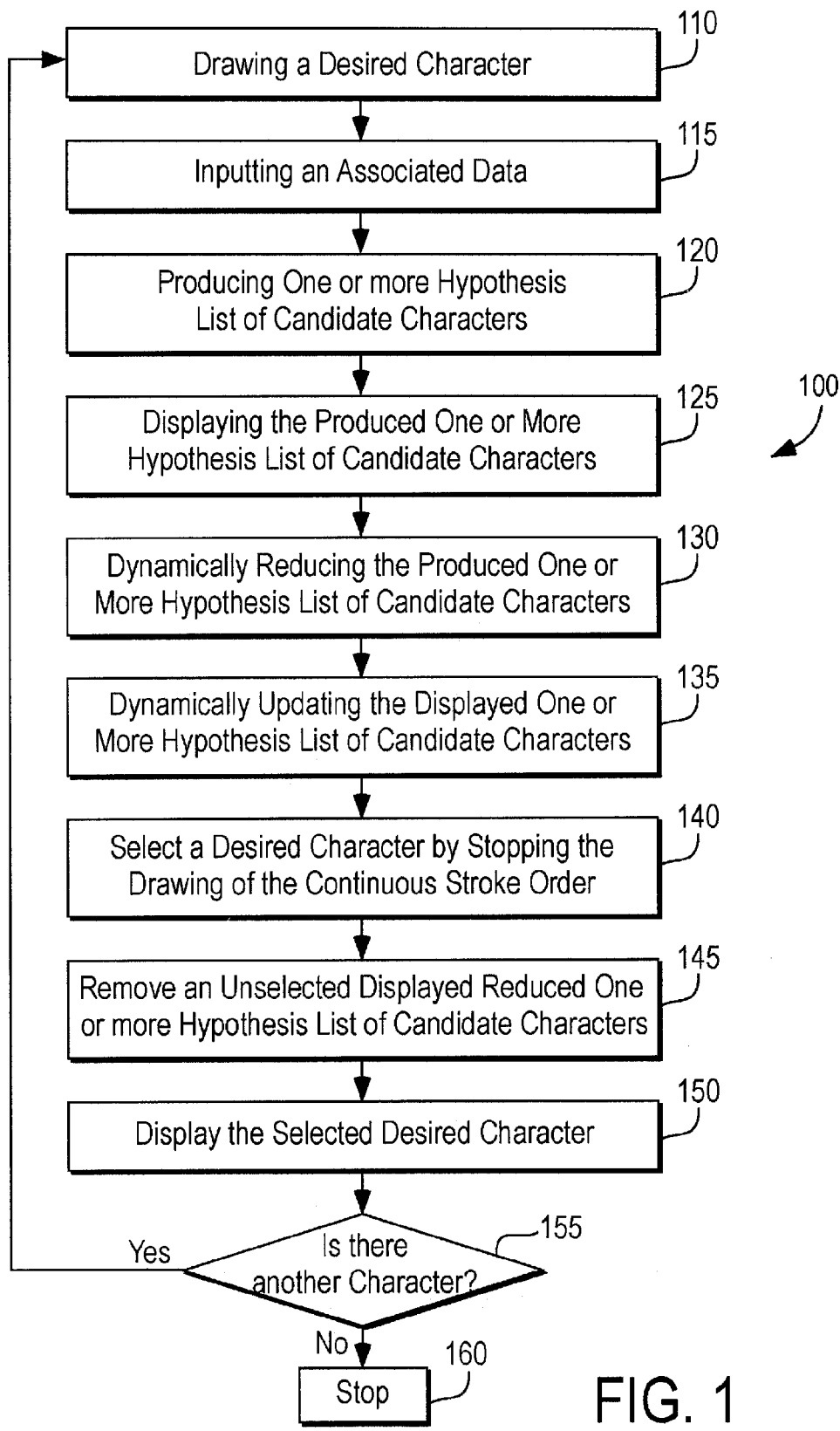
FIG. 1 is a flowchart illustrating an example method of data entry into a computer according to an embodiment of the present subject matter.

FIG. 1 illustrates an example method 100 of continuously recognizing a character entry into a computer. At step 110, this example method 100 begins to draw a desired character in a continuous stroke order using a stylus on a touch screen. The term "character" refers to a member of alphabetic, legographic, and/or phonetic/syllabic character set, which includes syllables, alphabets, numerals, and punctuation marks.

At step 115, an associated data of the continuous stroke order is inputted into a continuous character recognizer via the touch screen. At 120, one or more hypothesis candidate characters containing the associated data of the continuous stroke order is produced by the continuous character recognizer upon a partial recognition of the inputted associated data.

At 125, the produced one or more hypothesis candidate characters are then displayed substantially over and/or around the continuous stroke order. At 130, as the drawing of the continuous stroke order of the desired character further continues over one of the one or more of the displayed hypothesis candidate characters, the produced one or more hypothesis candidate characters is dynamically reduced. At 135, the displayed one or more hypothesis candidate characters substantially over and/or around the drawn continuous stroke order is dynamically updated as a function of the reduced one or more hypothesis candidate characters.

At 140, the desired character is selected upon completing the drawing of the continuous stroke order of the desired character over the reduced one or more produced hypothesis candidate characters using the stylus. The desired character can also be selected upon completing the drawing of the continuous stroke order over one of the displayed one or more hypothesis candidate characters using the stylus. In some embodiments, the desired character is selected upon updating the list of candidate characters to substantially one hypothesis candidate character and performing a stopping gesture using the stylus.

At 145, any unselected displayed reduced one or more hypothesis candidate characters are removed from the display upon selecting the desired character. At 150, the selected desired character is shown on the display device.

In some embodiments, the drawn continuous stroke order is displayed in a first contrasting color. In these embodiments, the one or more hypothesis candidate characters are displayed in a second contrasting color along with the continuous stroked order in the first contrasting color. In some embodiments, the first contrasting color is a dark color and the second contrasting color is a light color.

At 155, the method 100 checks whether there are any other characters that needs to be drawn and entered into a computer. Based on the determination at 155, the method 100 goes to 160 and stops further drawing and entering of a desired character, if there are no other characters that need to be drawn and entered into the computer. Based on the determination at 155, the method 100 goes to step 110 and repeats steps 110-160, if there is another character that needs to be drawn and entered into the computer.

Figure 2:
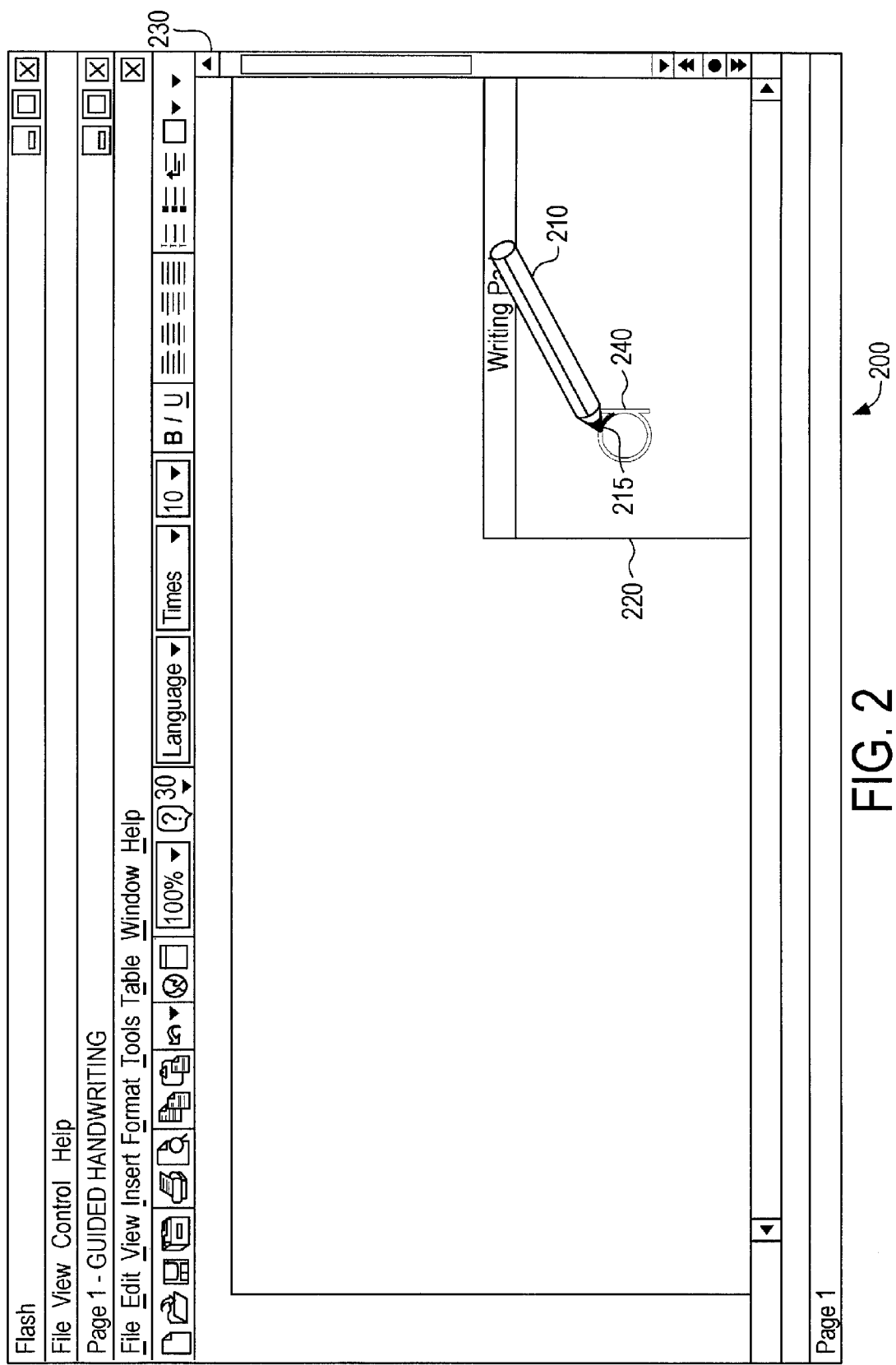
FIGS. 2-4 are screen shot representations that illustrate a sequence of continuous recognition of a character entry according to an embodiment of the present subject matter.

Referring now to FIG. 2, there is illustrated a screen shot 200 of drawing a continuous stroke order 215 of a desired character. The screen shot 200 shown in FIG. 2 shows a pen 210, a writing pad area 220, and a display screen of a display device 230. The pen 210 can be a stylus and the like. The writing pad area 220 can be a touch screen and the like. FIG. 2 shows a drawing of the desired character a in a continuous stroke order 215 using the pen 210 on the touch screen 220. Also it can be seen in FIG. 2, the displaying of the one or more hypothesis candidate characters 240, which are characters a and d, substantially over the drawn continuous stroke order 215 upon a partial recognition of the inputted continuous stroke order 215.

Figure 3:
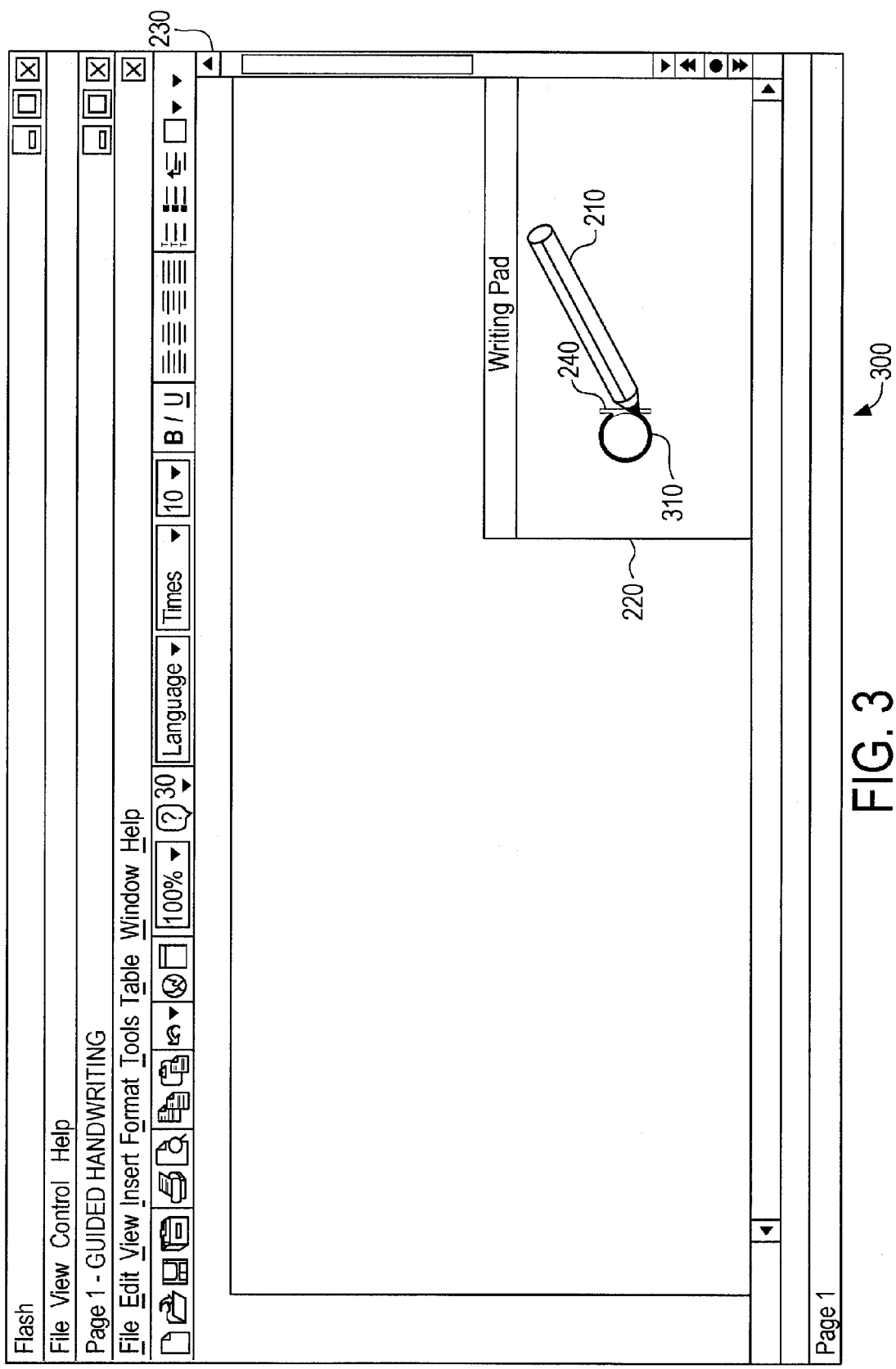

Referring now to FIG. 3, there is illustrated a screen shot 300 of continuing the drawing of the continuous stroke order 310 of the desired character a. Also it can be seen in FIG. 3, that the one or more hypothesis candidate characters 240 are still displayed as the drawing of the continuous stroke order 310 continues using the pen 210 on the touch screen 220.

Figure 4:
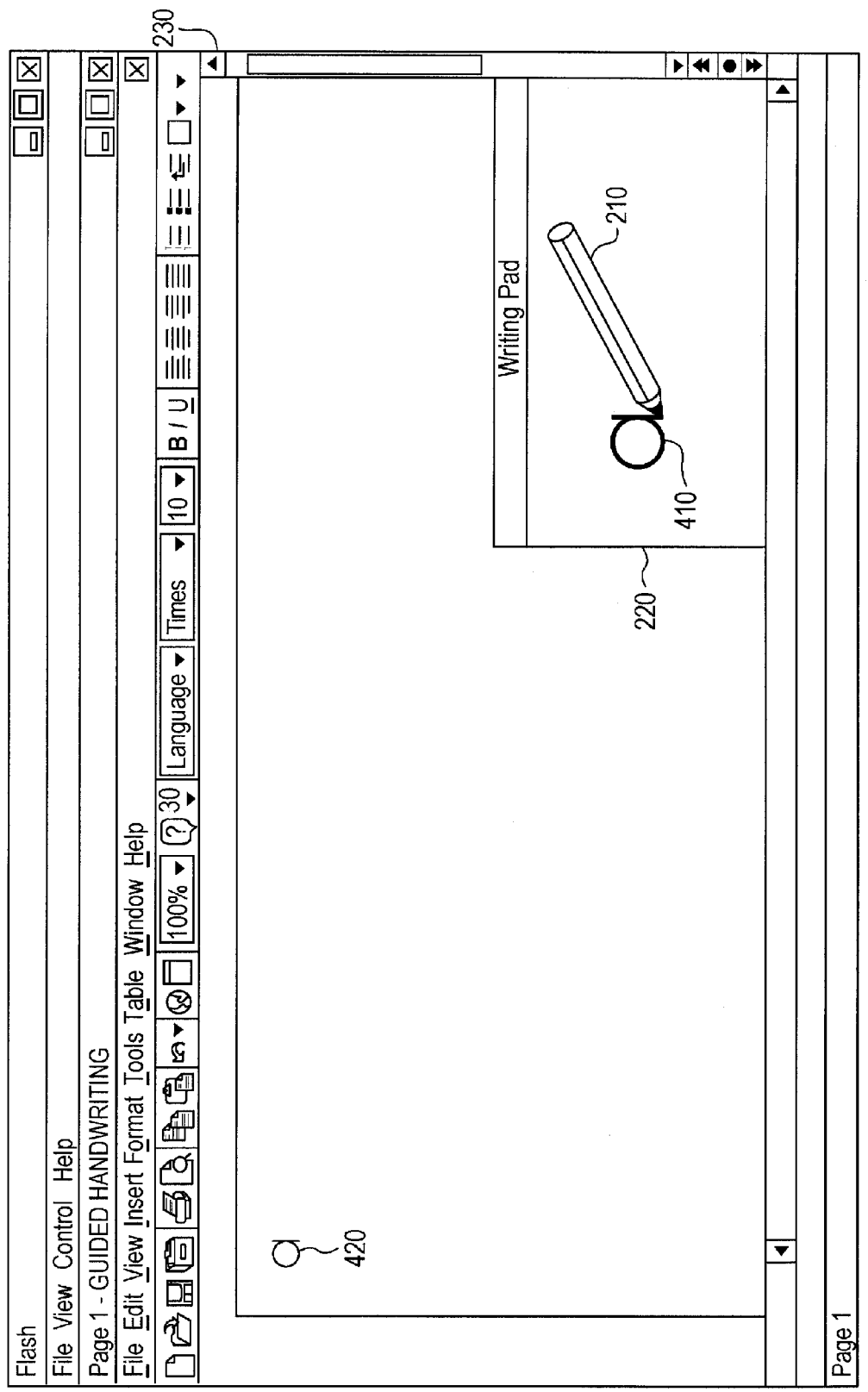

Referring now to FIG. 4, there is illustrated a screen shot 400 of completing the drawing of the continuous stroke order 410 of the desired character and performing the stopping gesture to select the desired character a 420. As shown in FIG. 4. it can be seen that the desired character 420 is shown on the display screen 230 upon performing the stopping gesture by the pen 210 on the touch screen 220. Also it can be seen in FIG. 4, that the hypothesis candidate character d is removed from the touch screen 220 upon performing the stopping gesture using the pen 210 on the touch screen 220.

Figure 5:
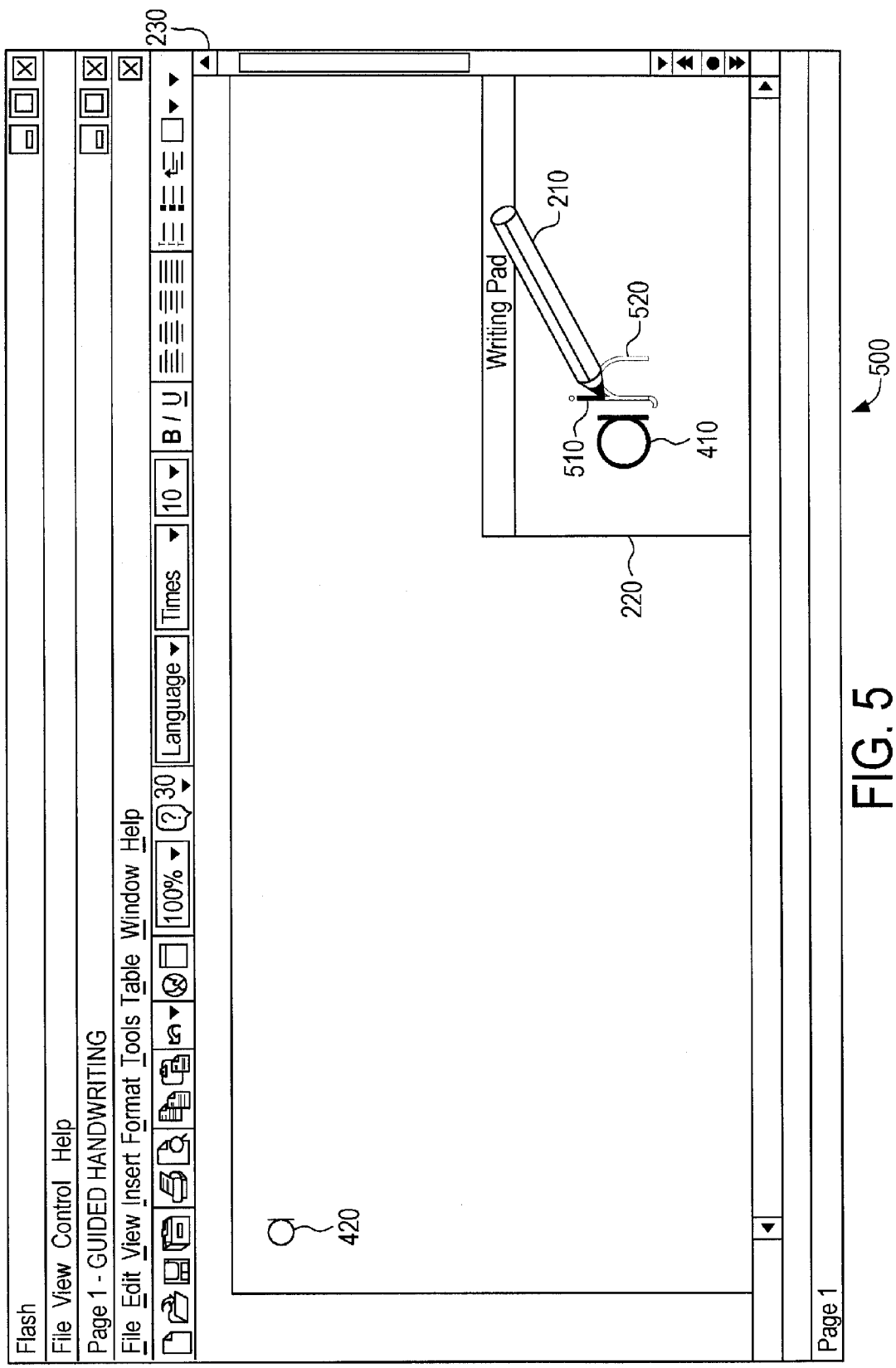
FIGS. 5-8 are screen shot representations that illustrate a sequence of continuous recognition of another character entry according to an embodiment of the present invention.

Referring now to FIG. 5, there is illustrated a screen shot 500 of drawing a continuous stroke order 215 of a next desired character. The screen shot 500 shown in FIG. 5 shows a pen 210, a writing pad area 220, and a display screen of a display device 230. FIG. 5 shows a drawing of the desired character b in a continuous stroke order 515 using the pen 210 on the touch screen 220. Also it can be seen in FIG. 5, the displaying of the one or more hypothesis candidate characters 520, which are characters j, h, and b, substantially over the drawn continuous stroke order 510 upon a partial recognition of the inputted continuous stroke order 510.

Figure 6:
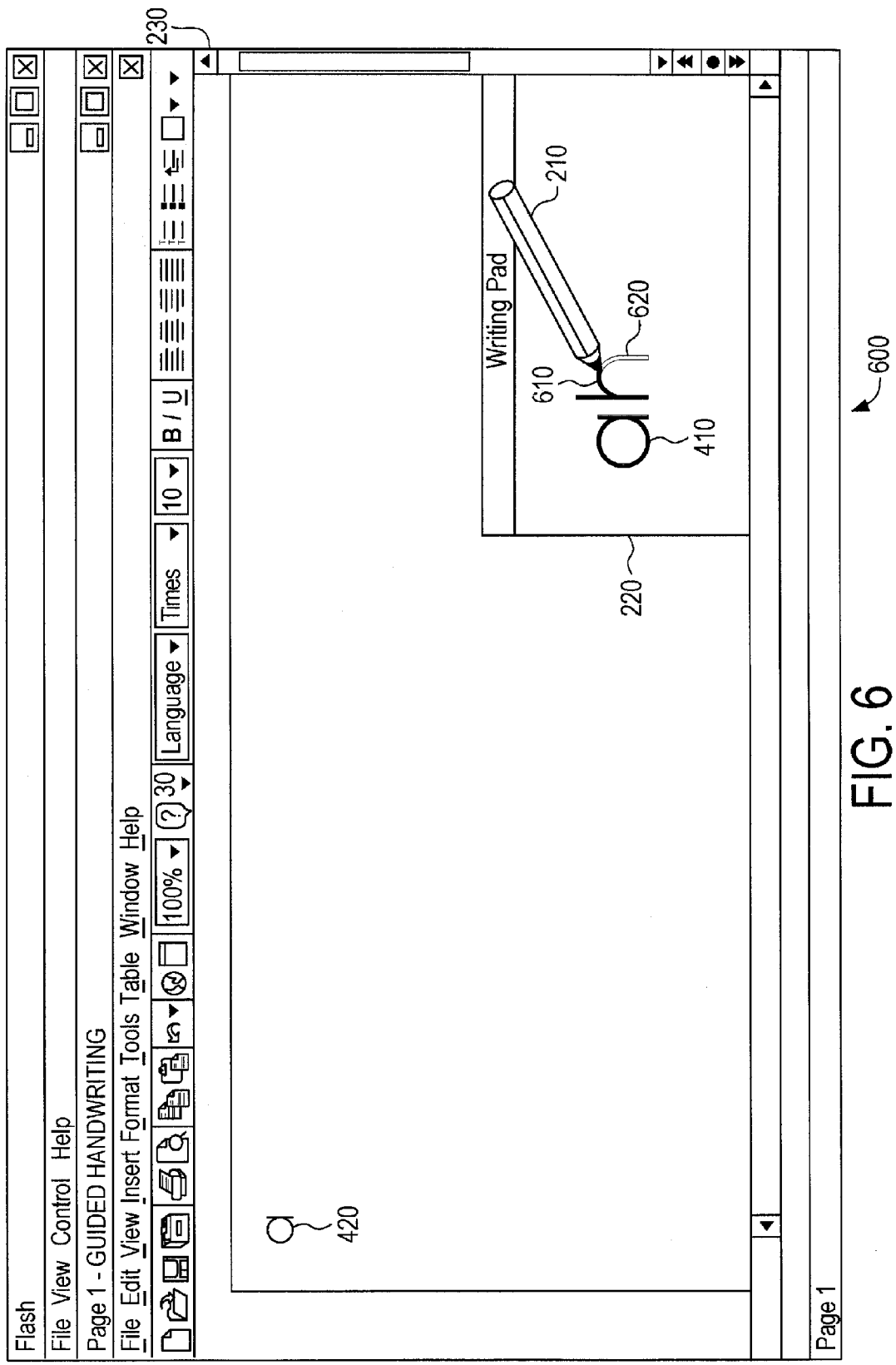

Referring now to FIG. 6, there is illustrated a screen shot 600 of continuing the drawing of the continuous stroke order 610 of the desired character b. Also it can be seen in FIG. 6, that the previously displayed one or more hypothesis candidate characters 510 (shown in FIG. 5) are reduced and updated to h and b as the drawing of the continuous stroke order 610 continues using the pen 210 on the touch screen 220. The previously displayed candidate character j (shown in FIG. 5) has been removed from the display as the character recognition continues substantially simultaneously with the inputted associated data of the continuous stroke order 610 continues.

Figure 7:
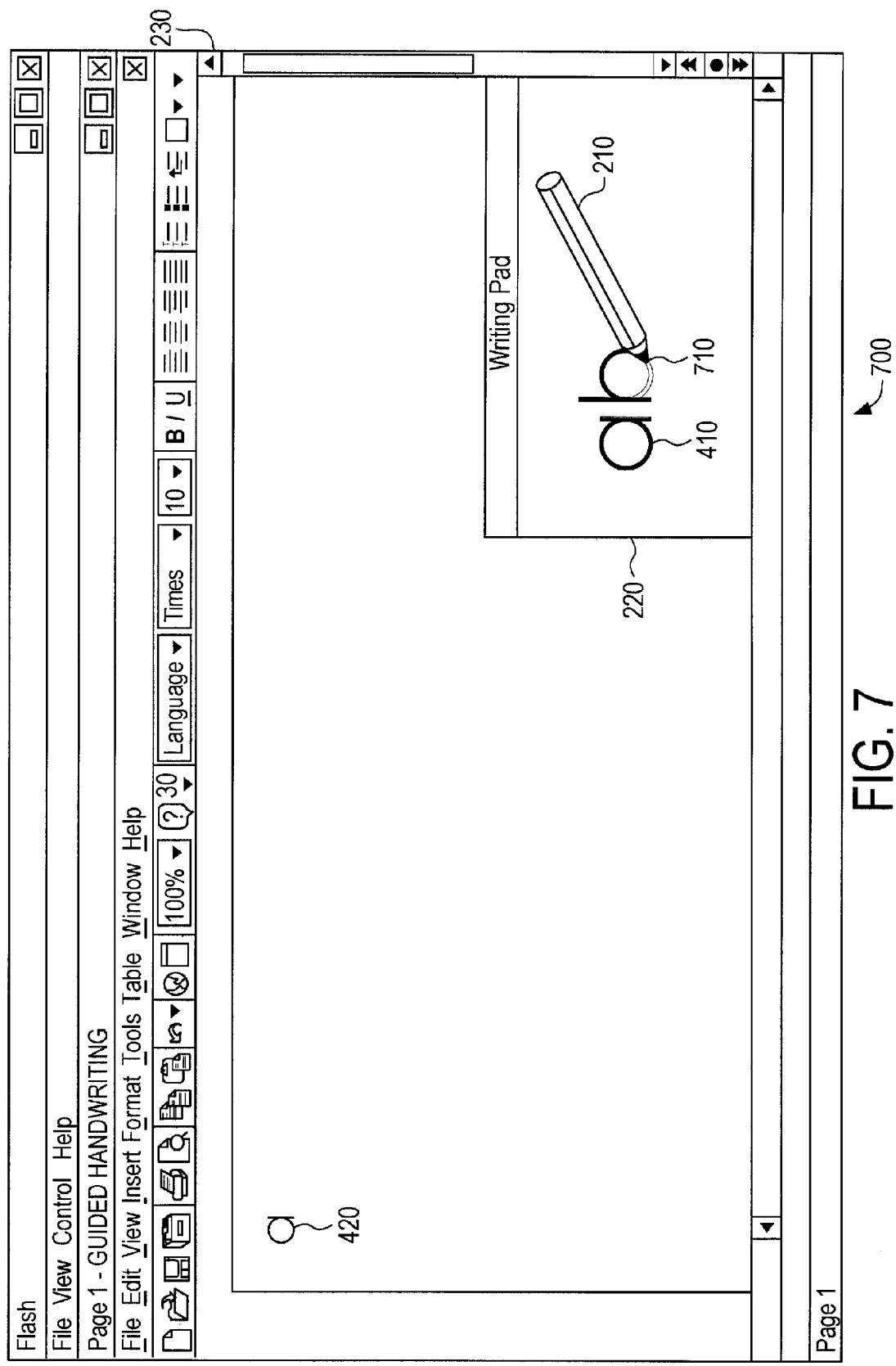

Referring now to FIG. 7, there is illustrated a screen shot 700 of continuing the drawing of the continuous stroke order 710 of the desired character b. Also it can be seen in FIG. 7, that the previously displayed one or more hypothesis candidate characters 520 (shown in FIG. 5) are reduced and update to the desired character b, as the drawing of the continuous stroke order 710 continues using the pen 210 on the touch screen 220. It can be seen that the previously displayed candidate character h (Shown in FIG. 6) has been removed from the display as the character recognition continues substantially simultaneously with the inputted associated data of the continuous stroke order 710.

Figure 8:
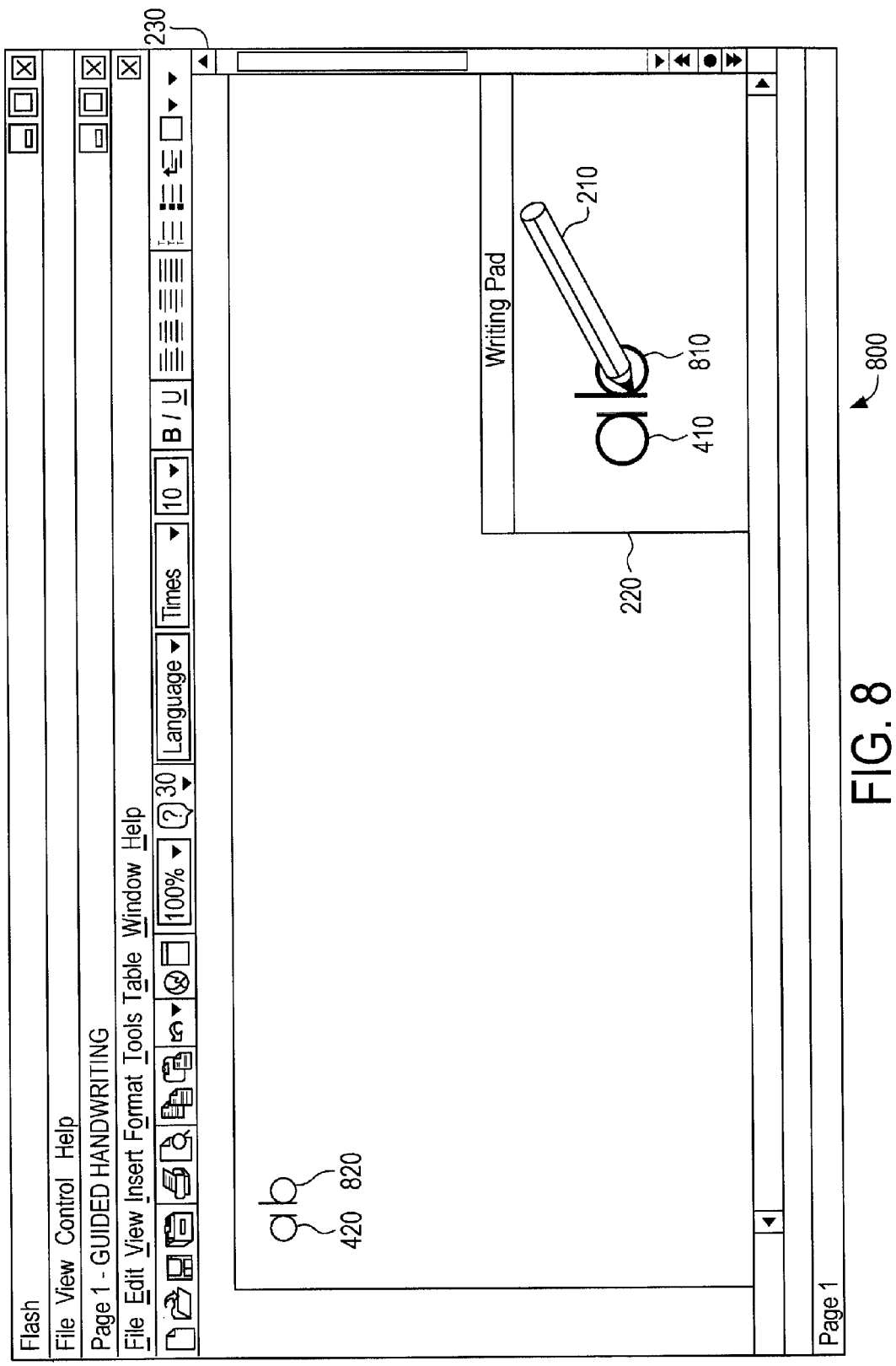

Referring now to FIG. 8, there is illustrated a screen shot 800 of completing the drawing of the continuous stroke order 810 of the desired character and performing the stopping gesture to select the desired character b 820. As shown in FIG. 8, it can be seen that the desired character 820 is displayed on the display screen 230 upon performing the stopping gesture by the pen 210 on the touch screen 220.

Although the flowchart 100 includes steps 110-160 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present subject matter can be implemented in software, which may be run in the environment shown in FIG. 9 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 9:
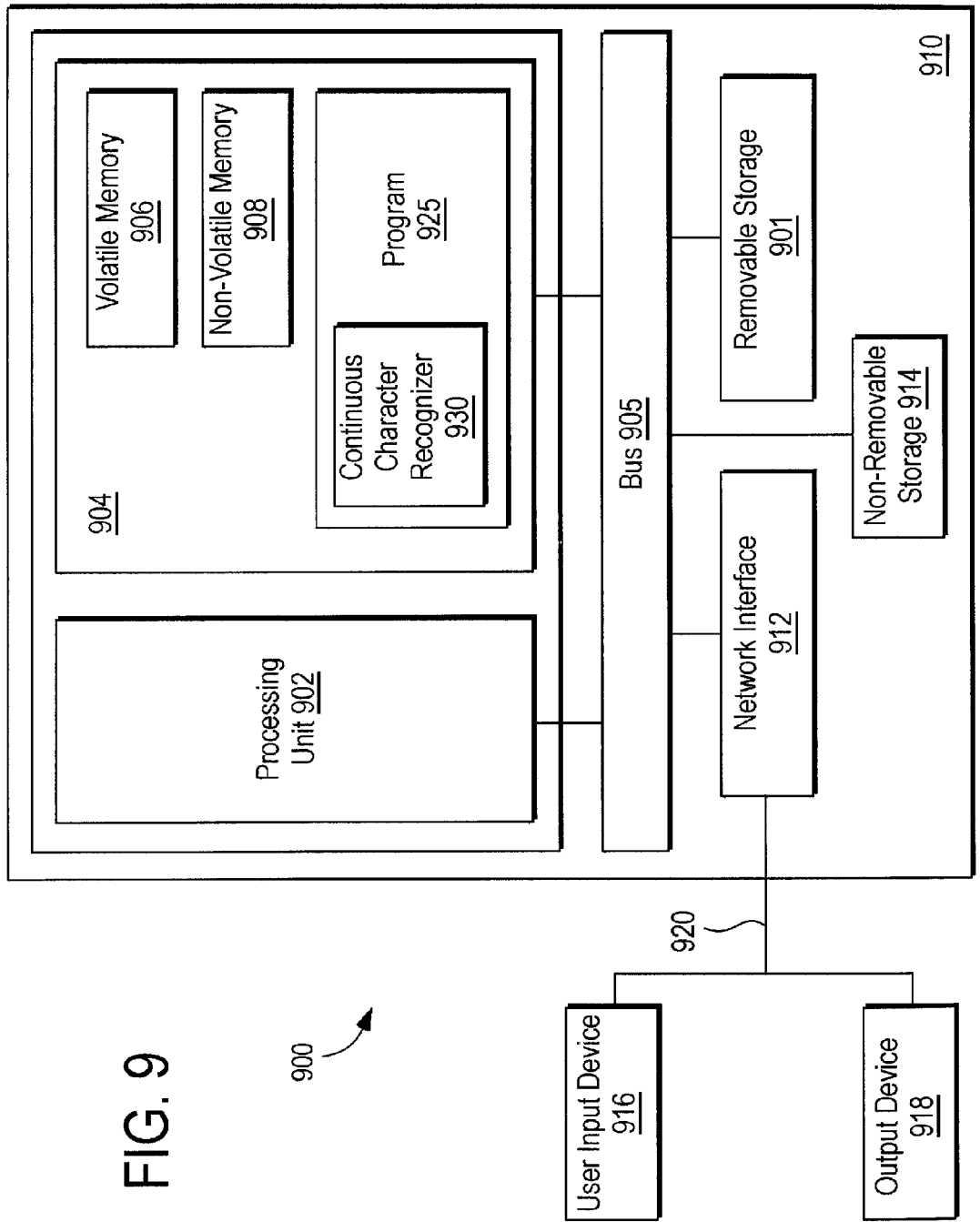
FIG. 9 is a block diagram of a typical computer system used for implementing embodiments of the present subject matter, such as those shown in FIGS. 1 and 2.

FIG. 9 shows an example of a suitable computing system environment for implementing embodiments of the present subject matter. FIG. 9 and the following discussion are intended to provide a brief, general description of a suitable computing environment in which certain embodiments of the inventive concepts contained herein may be implemented.

A general computing device, in the form of a computer 910, may include a processing unit 902, memory 904, removable storage 912, and non-removable storage 414. Computer 910 additionally includes a bus 905 and a network interface (NI) 901.

Computer 910 may include or have access to a computing environment that includes one or more input devices 916, one or more output devices 918, and one or more communication connections 920 such as a network interface card or a USB connection. The one or more input devices 916 can be a touch screen and a stylus and the like. The one or more output devices 918 can be a display device of computer, computer monitor, TV screen, plasma display, LCD display, display on a touch screen, and the like. The computer 910 may operate in a networked environment using the communication connection 920 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 904 may include volatile memory 906 and non-volatile memory 908. A variety of computer-readable media may be stored in and accessed from the memory elements of computer 910, such as volatile memory 906 and non-volatile memory 908, removable storage 912 and non-removable storage 914. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 902 of the computer 910. For example, a computer program 925 may include machine-readable instructions capable of continuously recognizing data entry according to the teachings and herein described embodiments of the present subject matter. In one embodiment, the computer program 925 may be included on a CD-ROM and loaded from the CD-ROM to a hard drive in non-volatile memory 908. The machine-readable instructions cause the computer 910 to encode according to the various embodiments of the present subject matter. As shown, the computer program 925 includes a continuous character recognizer 930.

In operation, a desired character is drawn in a continuous stroke order using a touch screen and a pen 916. The continuous character recognizer 930 that is responsive to the drawn continuous stroke order generates one or more potential list of characters having the continuous stroke order of the desire character upon a substantially partial recognition of the inputted continuous stroke order.

The display device 918 shows the generated one or more potential list of characters in a light contrasting color. The continuous character recognizer 930 reduces the generated one or more potential list of characters as the drawing of the desired character continues over the one of the generated one or more potential list of characters. The display device 918 then continuously updates the displayed generated one or more potential list of characters as a function of the reduced potential list of candidate characters by the continuous character recognizer until the drawing of the desired character is completed.

In these embodiments, the continuous character recognizer 930 removes the reduced one or more generated potential list of candidate characters from the display upon completion of the drawing of the desired character in the continuous stroke order and entering a selection gesture using the touch screen and the pen 916 to select the desired character. The display device 918 then displays the selected desired character.

In these embodiments, the display device 918 displays the generated one or more potential list of characters in the light contrasting color substantially over the entered continuous stroke order of the desired character. The display device 918 shows the continuous stroke order in a dark contrasting color. The continuous character recognition of a drawn desire character on a touch screen using a pen according to the various embodiments of the present invention is described in more detail with reference to FIGS. 1-8.

The continuous character recognizer of the present subject matter is modular and flexible in terms of usage in the form of a "Distributed Configurable Architecture". As a result, parts of the continuous character recognizer may be placed at different points of a network, depending on the model chosen. For example, the continuous character recognizer can be deployed in a server and the input and output data elements streamed over from a client to the server and back, respectively. The encoder can also be placed on each client, with the database management centralized. Such flexibility allows faster deployment to provide a cost effective solution to changing business needs.

The above description is intended to be illustrative, and not restrictive. Many other embodiments will be apparent to those skilled in the art. The scope of the subject matter should therefore be determined by the appended claims, along with the full scope of equivalents to which such claims are entitled.

The above-described methods and apparatus provide various embodiments for continuous character recognition. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-9 are merely representational and are not drawn to scale. Certain proportions thereof may be exaggerated, while others may be minimized. FIGS. 1-9 illustrate various embodiments of the subject matter that can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for continuous recognition of a character entry into a computer comprising:
    drawing a desired character in a continuous stroke order using a stylus on a touch screen;
    inputting an associated data of the continuous stroke order, as the continuous stroke order continues, into a continuous character recognizer via the touch screen;
    producing one or more hypothesis candidate characters including the associated data of the continuous stroke order by the continuous character recognizer upon a partial recognition of the associated data;
    displaying the produced one or more hypothesis candidate characters substantially overlapping the drawn continuous stroke order on a display device.

2. The method of claim 1, further comprising:
    selecting the desired character upon updating the displayed one or more hypothesis candidate characters to substantially one hypothesis candidate character and performing a stopping gesture using the stylus.

3. The method of claim 1, further comprising:
    selecting the desired character upon completing the drawing of the continuous stroke order over one of the displayed one or more hypothesis candidate characters using the stylus;
    removing any unselected displayed reduced one or more hypothesis candidate characters from the display; and
    displaying the selected desired character on the display device.

4. The method of claim 3, further comprising:
    repeating the drawing, inputting, producing, displaying, dynamically reducing, dynamically updating, and selecting steps to select a next desired character.

5. The method of claim 1, wherein displaying the one or more hypothesis candidate characters comprises:
    displaying the drawn continuous stroke order in a first contrasting color along with the one or more hypothesis candidate characters in a second contrasting color.

6. An article comprising:
    a storage medium having instructions that, when executed by a computing platform, result in execution of a method comprising:
        drawing a desired character in a continuous stroke order using a stylus on a touch screen;
        inputting an associated data of the continuous stroke order, as the continuous stroke order continues, into a continuous character recognizer via the touch screen;
        producing one or more hypothesis candidate characters including the associated data of the continuous stroke order by the continuous character recognizer upon a partial recognition of the associated data;
        displaying the produced one or more hypothesis candidate characters substantially overlapping the drawn continuous stroke order on a display device.

7. The article of claim 6, further comprising:
    selecting the desired character upon updating the displayed one or more hypothesis candidate characters to substantially one hypothesis candidate character and performing a stopping gesture using the stylus.

8. The article of claim 6, further comprising:
    selecting the desired character upon completing the drawing of the continuous stroke order of the desired character over the reduced one or more of the produced hypothesis candidate characters and performing a stopping gesture;
    removing any unselected displayed reduced one or more hypothesis candidate characters from the display; and
    displaying the selected desired character on the display device.

9. The article of claim 8, further comprising:
    repeating the drawing, inputting, producing, displaying, dynamically reducing, dynamically updating, and selecting steps to select a next desired character.

10. The article of claim 6, wherein displaying the one or more hypothesis candidate characters comprises:
    displaying the drawn continuous stroke order in a first contrasting color along with the one or more hypothesis candidate characters in a second contrasting color.

11. An apparatus for continuous character entry recognition comprising:
    a touch screen and a pen for drawing a desired character in a continuous stroke order;
    a continuous character recognizer coupled to the touch screen that is responsive to the drawn continuous stroke order of the desired character, wherein the continuous character recognizer generates one or more potential list of characters including the continuous stroke order of the desired character upon a substantially partial recognition of the continuous stroke order; and
    a display device coupled to the continuous character recognizer to display the generated one or more potential list of characters substantially overlapping the drawn continuous stroke order of the desired character, wherein the continuous character recognizer to continuously reduce the generated one or more potential list of characters as the drawing of the desired character continues over the one of the generated one or more potential list of characters, and wherein the continuous character recognizer to continuously update the displayed generated one or more potential list of characters as a function of the reduced potential list of candidate characters until the drawing of the desired character is completed.

12. The apparatus of claim 11, wherein the continuous character recognizer to remove the reduced one or more generated potential list of candidate characters from the display upon completion of the drawing of the desired character in the continuous stroke order and entering a selection gesture using the touch screen the pen to select the desired character, and wherein the display device to display the selected desired character.

13. The apparatus of claim 12, wherein the display device displays the generated one or more potential list of characters in the light contrasting color over the entered continuous stroke order of the desired character, and wherein the entered continuous stroke order is displayed in a dark contrasting color.

14. The apparatus of claim 11, wherein the display device is a device selected from the group comprising computer monitor, TV screen, plasma display, LCD, display on an electronic tablet.

15. A computer system for continuous recognition of a character entry into a computer comprising:
- a network interface;
- an input module coupled to the network interface that receives the input data stream via the network interface;
- a processing unit;
- a memory coupled to the processing unit;
- a user input device for drawing a desired character in a continuous stroke order;
- a continuous character recognizer coupled to the touch screen that is responsive to the drawn continuous stroke order of the desired character, wherein the continuous character recognizer generates one or more potential list of characters including the continuous stroke order of the desired character upon a substantially partial recognition; and
- an output device coupled to the continuous character recognizer to display the generated one or more hypothesis candidate characters substantially overlapping the drawn continuous stroke order of the desired character, wherein the continuous character recognizer to continuously reduce the generated one or more hypothesis candidate characters as the drawing of the desired character continues over the one of the generated one or more hypothesis candidate characters, and wherein the continuous character recognizer to continuously update the displayed generated one or more hypothesis candidate characters as a function of the reduced hypothesis candidate characters until the drawing of desired character is completed.

16. The system of claim 15, wherein the continuous character recognizer to remove the reduced one or more generated potential list of candidate characters from the display upon completion of the drawing of the desired character in the continuous stroke order and entering a selection gesture by the pen to select the desired character, and wherein the display device to display the selected desired character.

17. The system of claim 16, wherein the output device displays the generated one or more potential list of characters in the light contrasting color over the entered continuous stroke order of the character, and wherein the entered continuous stroke order is displayed in a dark contrasting color.

18. The system of claim 15, wherein the output device is a device selected from the group comprising computer monitor, TV screen, plasma display, LCD, display on an electronic tablet.

19. The method of claim 1, further comprising:
- dynamically reducing the produced one or more hypothesis candidate characters substantially overlapping the drawn continuous stroke order as the continuous stroke order further continues over one of the displayed one or more hypothesis candidate characters by the continuous character recognizer; and
- dynamically updating the displayed one or more hypothesis candidate characters substantially overlapping the drawn continuous stroke order as a function of the reduced one or more hypothesis candidate characters by the continuous character recognizer.

20. The article of claim 6, further comprising:
- dynamically reducing the produced one or more hypothesis candidate characters substantially overlapping the drawn continuous stroke order as the continuous stroke order further continues over one of the displayed one or more hypothesis candidate characters by the continuous character recognizer; and
- dynamically updating the displayed one or more hypothesis candidate characters substantially overlapping the drawn continuous stroke order as a function of the reduced one or more hypothesis candidate characters by the continuous character recognizer.

* * * * *